United States Patent
Lee et al.

(10) Patent No.: US 11,708,150 B2
(45) Date of Patent: Jul. 25, 2023

(54) HYBRID MAIN LANDING GEAR FITTING WITH DETACHABLE DRAG ARM

(71) Applicant: SAFRAN LANDING SYSTEMS CANADA INC., Ajax (CA)

(72) Inventors: Randy Lee, Oshawa (CA); Zoran Pasic, Etobicoke (CA); Charles Borchert, Whitby (CA); Adam Lucci, Toronto (CA)

(73) Assignee: Safran Landing Systems Canada Inc., Ajax (CA)

( * ) Notice: Subject to any disclaimer, the term of this patent is extended or adjusted under 35 U.S.C. 154(b) by 45 days.

(21) Appl. No.: 17/171,219

(22) Filed: Feb. 9, 2021

(65) Prior Publication Data

US 2022/0250740 A1    Aug. 11, 2022

(51) Int. Cl.
*B64C 25/20* (2006.01)
*B64C 25/00* (2006.01)

(52) U.S. Cl.
CPC ............ *B64C 25/20* (2013.01); *B64C 25/001* (2013.01); *B64C 2025/003* (2013.01)

(58) Field of Classification Search
CPC ......... B64C 25/10; B64C 25/12; B64C 25/14; B64C 25/18; B64C 25/20; B64C 25/22; B64C 25/24; B64C 25/26; B64C 25/58; B64C 25/60; B64C 2025/125
See application file for complete search history.

(56) References Cited

U.S. PATENT DOCUMENTS

| | | | |
|---|---|---|---|
| 2,444,319 A | 6/1948 | Winter | |
| 2,559,451 A * | 7/1951 | Mcbrearty | B64C 25/14 188/289 |
| 2,562,778 A | 7/1951 | Egly | |
| 3,173,633 A * | 3/1965 | Alvarez-Calderon | B64C 25/12 244/102 R |
| 4,047,681 A * | 9/1977 | Hartel | B64C 25/12 244/102 SS |
| 2009/0108131 A1 | 4/2009 | Lavigne et al. | |
| 2012/0193470 A1* | 8/2012 | Kosheleff | B64C 25/12 244/102 R |
| 2012/0217341 A1* | 8/2012 | Bennett | B64C 25/20 244/102 A |

(Continued)

FOREIGN PATENT DOCUMENTS

| | | |
|---|---|---|
| EP | 3 031 602 A1 | 7/1981 |
| EP | 1 977 969 A1 | 10/2008 |

(Continued)

OTHER PUBLICATIONS

International Search Report and Written Opinion dated May 5, 2022, issued in corresponding International Application No. PCT/CA2022/050163, filed Feb. 4, 2022, 13 pages.

*Primary Examiner* — Philip J Bonzell
*Assistant Examiner* — Colin Zohoori
(74) *Attorney, Agent, or Firm* — Christensen O'Connor Johnson Kindness PLLC

(57) ABSTRACT

An aircraft landing gear assembly includes a main fitting comprising having a main barrel and a cross beam fixedly positioned relative to the main barrel and extending radially from the main barrel. The main fitting further includes a drag arm with a first end pivotally coupled to the cross beam by a first pivotal connection and a second end pivotally coupled to the main barrel by a second pivotal connection.

17 Claims, 6 Drawing Sheets

(56) References Cited

U.S. PATENT DOCUMENTS

| | | | |
|---|---|---|---|
| 2013/0119197 A1* | 5/2013 | Ducos | B64C 25/26 |
| | | | 244/102 R |
| 2017/0036757 A1* | 2/2017 | Luce | B64C 25/10 |
| 2018/0031028 A1* | 2/2018 | Himmelmann | B64C 25/12 |
| 2020/0094950 A1 | 3/2020 | Bennett | |

FOREIGN PATENT DOCUMENTS

| | | |
|---|---|---|
| EP | 2 835 311 A1 | 2/2015 |
| EP | 3 366 579 A1 | 8/2018 |
| WO | 2010/063895 A1 | 6/2010 |
| WO | 2014/108503 A1 | 7/2014 |

* cited by examiner

HYBRID MAIN LANDING GEAR FITTING WITH DETACHABLE DRAG ARM

BACKGROUND

Main landing gear assemblies for commercial aircraft typically include a main fitting pivotally coupled to the aircraft for reciprocating movement between a stowed position within the aircraft (during flight) and a deployed position, in which the landing gear assemblies extend downwardly from the aircraft (during take-off, landing, and when the aircraft is on the ground). An example of a known landing gear assembly is disclosed in U.S. Patent Publication No. 2020/0094950, currently assigned to SAFRAN LANDING SYSTEMS UK LTD, the disclosure if which is incorporated herein by reference in its entirety.

Main fittings for known landing gear assemblies are subject to high loads and have complex geometry. In order to safely withstand the resulting stress states, main fittings are typically made of high alloy steels such as 300M, aluminum or titanium alloys. These fittings are heavily machined from forgings and manufactured using complex production processes. These large and robust metal parts, even when optimized to reduce weight, significantly contribute to the overall weight of the landing gear assemblies.

Main landing gear assemblies are also known to be a significant source of noise generated by commercial aircraft. These assemblies are extended below the wings and exposed to the air flow when the aircraft is flying at a low altitude and at high speeds. During landing procedures, known landing gear systems have been measured to generate as much as 30% of the total aircraft noise. However, because the landing gear assemblies are safety-critical aircraft systems and are designed primarily to support entire landing aircraft load, these complex assemblies are designed with little aerodynamic refinement. Thus, many bluff body components of the landing gear assemblies directly interact with the high-velocity airflow, making the landing gear a cluster of turbulent flow induced noise sources, particularly at low-frequency and medium-frequency ranges.

FIG. 1 shows a representative embodiment of a known landing gear assembly 20 for an aircraft. The landing gear assembly 20 includes a shock strut 22 comprising a main fitting 24 and a piston 26 slidably received within the main fitting. A wheel assembly 28 that includes an axle 30 and a plurality of wheels 32 rotatably mounted thereto is coupled to the piston 26. A torque link 34 operably coupled to the main fitting 24 and the wheel assembly 28 prevents the wheel assembly from rotating relative to the main fitting about the longitudinal axis of the piston 26. When the aircraft is on the ground, the landing gear assembly 20 is in a deployed position, and the aircraft is at least partially supported by the wheels 28 of the landing gear assembly.

The main fitting 24 has an elongate main barrel 36 with a first end 38 that slidably receives the piston 26. A trunnion 46 is formed at a second end 40 of the main barrel 36 and includes offset first and second coaxial lugs 42 and 44. The first and second lugs 42 and 44 are coupled to the aircraft to provide a rotatable connection about the common centerline 48 of the lugs. A cross tube 50 extends between the first lug 42 and the second lug 44. In the illustrated embodiment, the cross tube 50 is offset from axis 48, although in other configurations, the cross tube has a central axis coincident with axis 48, and the lugs 42 and 44 are integrally formed with the cross tube.

The main fitting 24 further includes an integral drag arm 52 that has a first end 54 proximate to a central portion of the main barrel 36 and a second end 56 proximate to the second lug 44 and the cross tube 50. The drag arm 52, which is positioned forward of the main barrel 36, and the cross tube 50 together fixedly position and stabilize the second lug 44 relative to the first lug 42.

Still referring to FIG. 1, an actuator 58 is connected to the main fitting 24 to selectively drive the landing gear assembly 20 between the deployed position (shown) and the stowed position. A foldable side brace 60 is rotatably coupled to the main barrel 36 to stabilize the landing gear assembly 20 in the deployed position.

The integrally formed drag arm 52 adds complexity to the design of the main fitting 24. This increased complexity adds manufacturing costs, as well as complex geometry required to transition between main fitting components and to support manufacturing processes. Because the drag arm 52 is integrally formed, the drag arm is subject not only to axial (typically tensile) loads, but also to non-axial tensile and compressive loads, as well as bending. Further, being located forward of the main barrel 36, the drag arm directs the incoming air flow down and significantly contributes to noise generation.

Referring now to FIG. 2, another known landing gear assembly 120 is shown. The landing gear assembly 120 is similar to the landing gear assembly 20 shown in FIG. 1, wherein parts of the landing gear assembly 120 indicated with a reference number 1XX correspond to a similar part shown in FIG. 1 with a reference number XX unless otherwise noted.

The landing gear assembly 120 is similar to the landing gear assembly 20 of FIG. 1 except that the drag arm 152 is a discretely formed part that is connected to other components of the main fitting 124 by pinned connections. More specifically, a first end 154 of the drag arm 152 is rotatably coupled to the main barrel 136 about a first axis 170, and a second end 156 of the drag arm is rotatably coupled to the trunnion 146 about a second axis 172.

While the drag arm 152 shown in FIG. 2 avoids some of the manufacturing complexity of the drag arm 52 shown in FIG. 1, the pinned connections at the end of the drag arm subject the drag arm to bending and twisting loads. In addition, because the drag arm 152 is essentially a blunt body located forward of the main barrel 136, the drag arm directs the incoming air flow down and significantly contributes to noise generation in a manner similar to that of the drag arm 52 of FIG. 1.

SUMMARY

Examples of landing gear main fittings suitable for use on an aircraft landing gear assembly are disclosed. These examples of main fittings provide a simpler, lighter, more aerodynamic main fitting that decreases weight and manufacturing costs, while also reducing drag and noise generated by the landing gear assembly. In an embodiment, the main fitting comprises a main barrel and a cross beam fixedly positioned relative to the main barrel and extending radially from the main barrel. A drag arm is provided and comprises a first end pivotally coupled to the cross beam by a first pivotal connection and a second end pivotally coupled to the main barrel by a second pivotal connection.

In some embodiments, the cross beam and the main barrel are integrally formed.

In some embodiments, the first pivotal connection comprises a clevis and a lug with a spherical bearing mounted thereto.

In some embodiments, the lug is integrally formed with the drag link, and the clevis is integrally formed with the cross beam.

In some embodiments, the lug is integrally formed with the cross beam, and the clevis is integrally formed with the drag link.

In some embodiments, the second pivotal connection comprises a clevis and a lug with a spherical bearing mounted thereto.

In some embodiments, the lug is integrally formed with the drag link, and the clevis is integrally formed with the main barrel.

In some embodiments, the lug is integrally formed with the main barrel, and the clevis is integrally formed with the drag link.

In some embodiments, the first and second pivotal connections define first and second pivot points, respectively, wherein the drag link is only subject to tensile and compressive loads along a line connecting the first and second pivot points.

In some embodiments, the first and second pivotal connections to not impart bending loads or torsional loads to the drag link.

In some embodiments, at least a portion of the drag link has an aerodynamic profile.

In some embodiments, the aerodynamic profile defines an airfoil.

In some embodiments, the drag arm comprises a different material than the main barrel.

In some embodiments, the drag arm is manufactured by additive manufacturing.

In some embodiments, the cross beam forms part of a trunnion configured to rotatably couple the landing gear assembly to the aircraft.

In some embodiments, the trunnion further comprises first and second lugs defining an axis of rotation.

In some embodiments, the cross beam comprises a cylindrical recess formed at each end to define an axis of rotation.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the present disclosure will become more readily appreciated as the same become better understood by reference to the following detailed description, when taken in conjunction with the accompanying drawings, wherein.

DETAILED DESCRIPTION

The present disclosure provides examples of a landing gear assembly with an improved main fitting. As will be described in further detail, the landing gear assembly includes a main fitting with a detachable drag arm. The detachable drag arm improves manufacturability and reduces the overall weight of the main fitting. Further, the disclosed main fitting limits the types of loads applied to the drag arm, allowing for a simpler, lighter, and more aerodynamic design.

Figure 1:
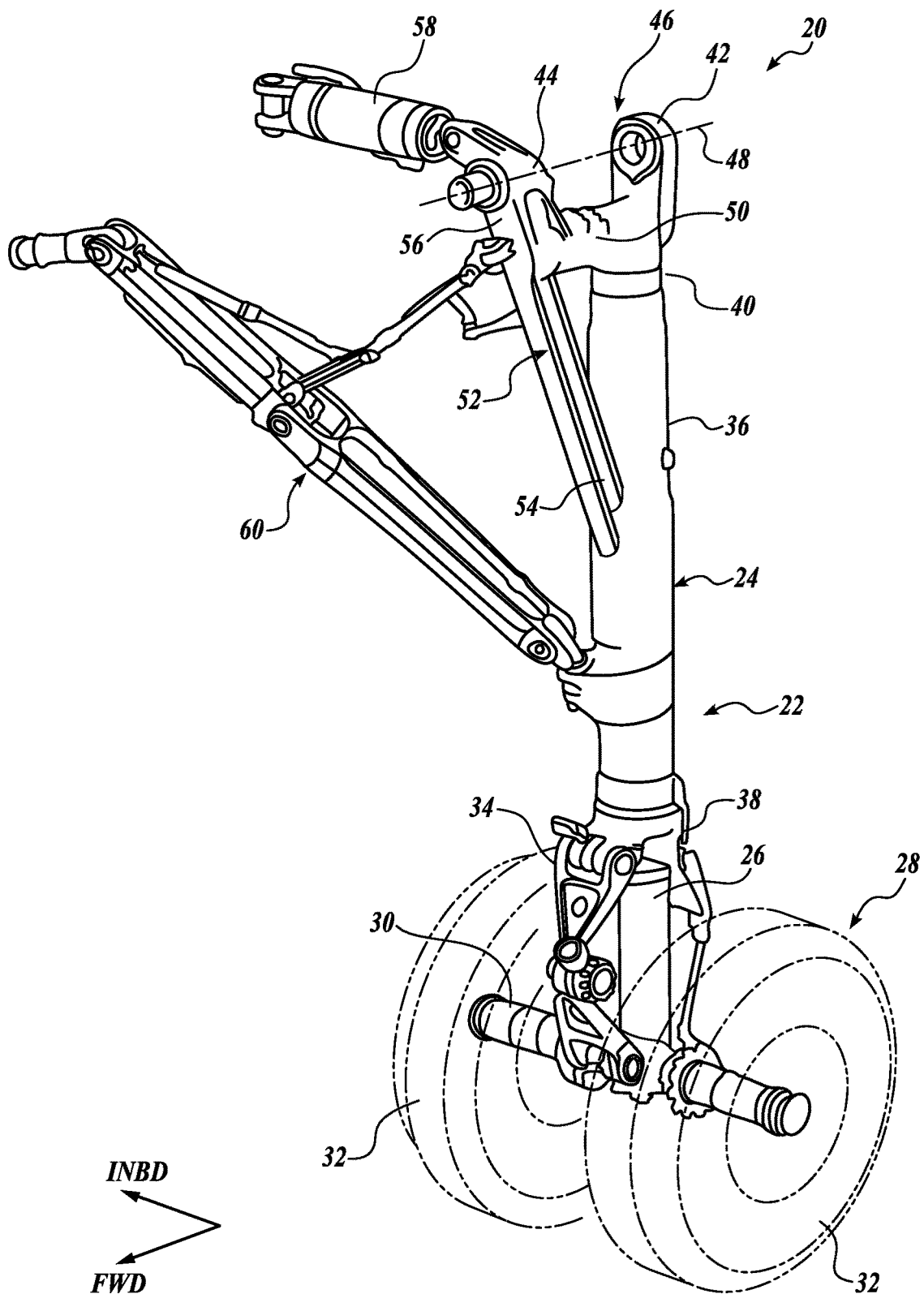
FIG. 1 shows an isometric view of a known main landing gear assembly in which a main fitting includes a drag arm integrally formed with a trunnion and a main barrel.
Figure 2:
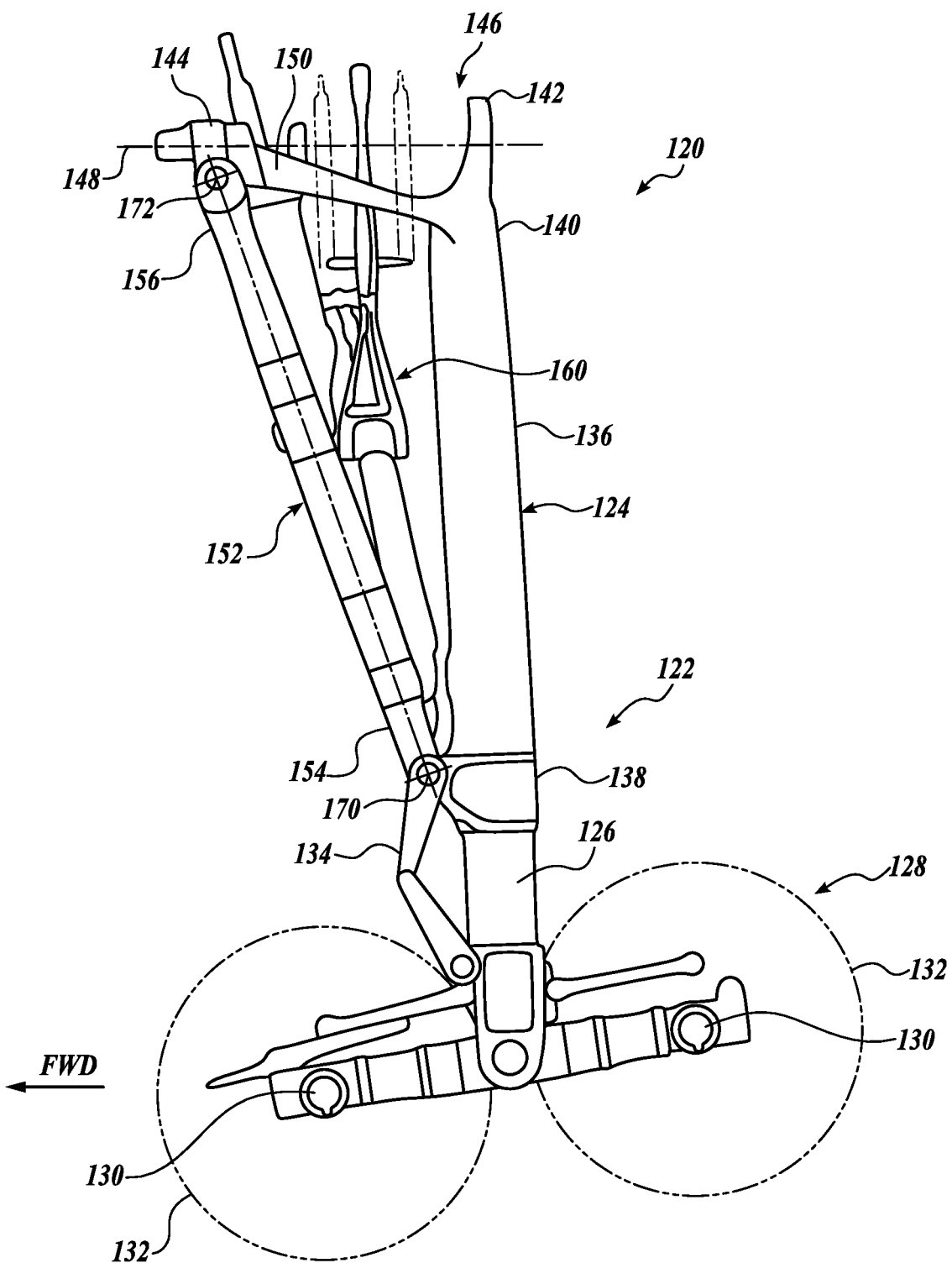
FIG. 2 shows a side view of a known main landing gear assembly in which a main fitting includes a drag arm rotatably pinned to a trunnion and the main barrel.
Figure 3:
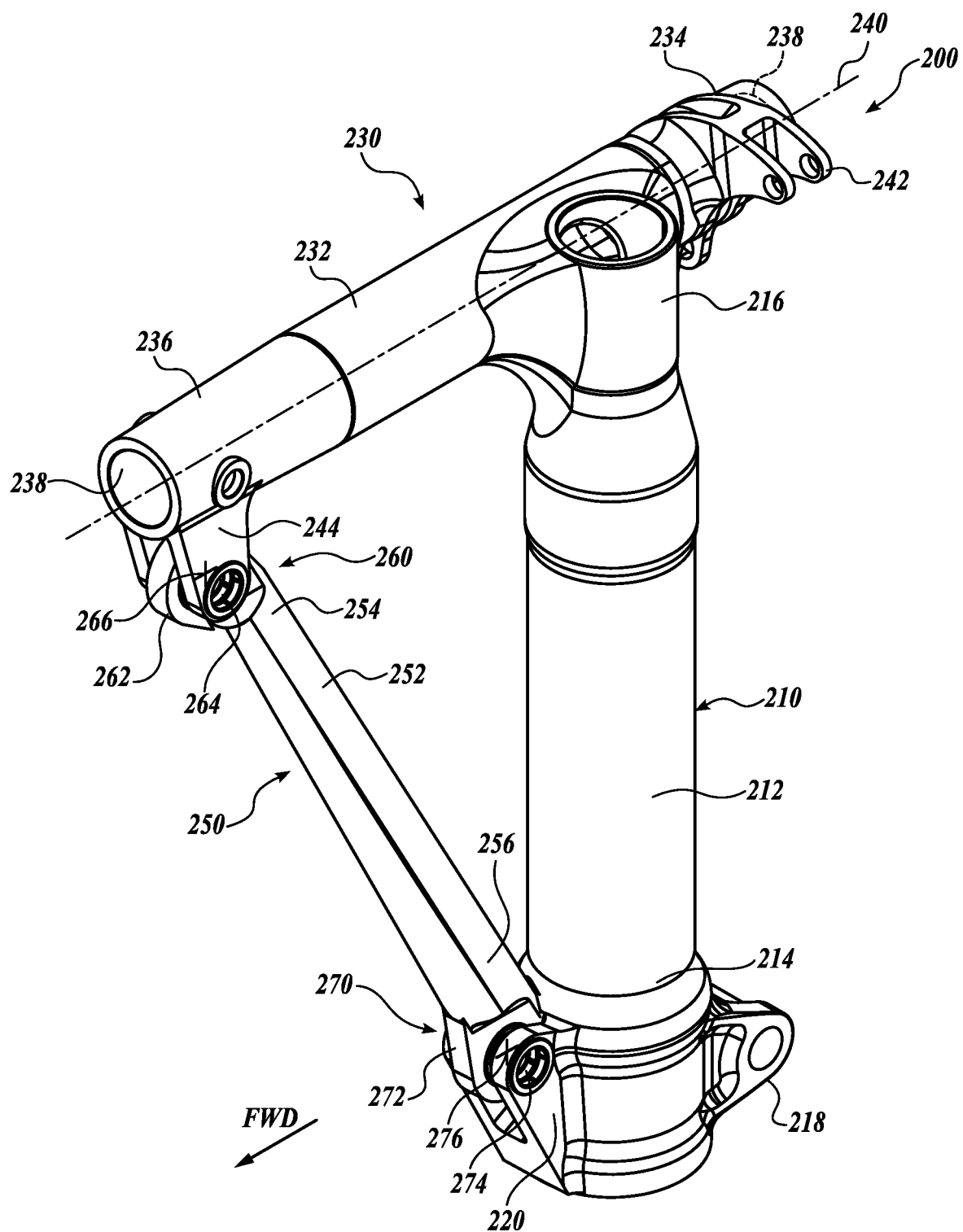
FIG. 3 shows an isometric view of a main fitting of a landing gear assembly according to a representative embodiment of the present disclosure.
Figure 4:
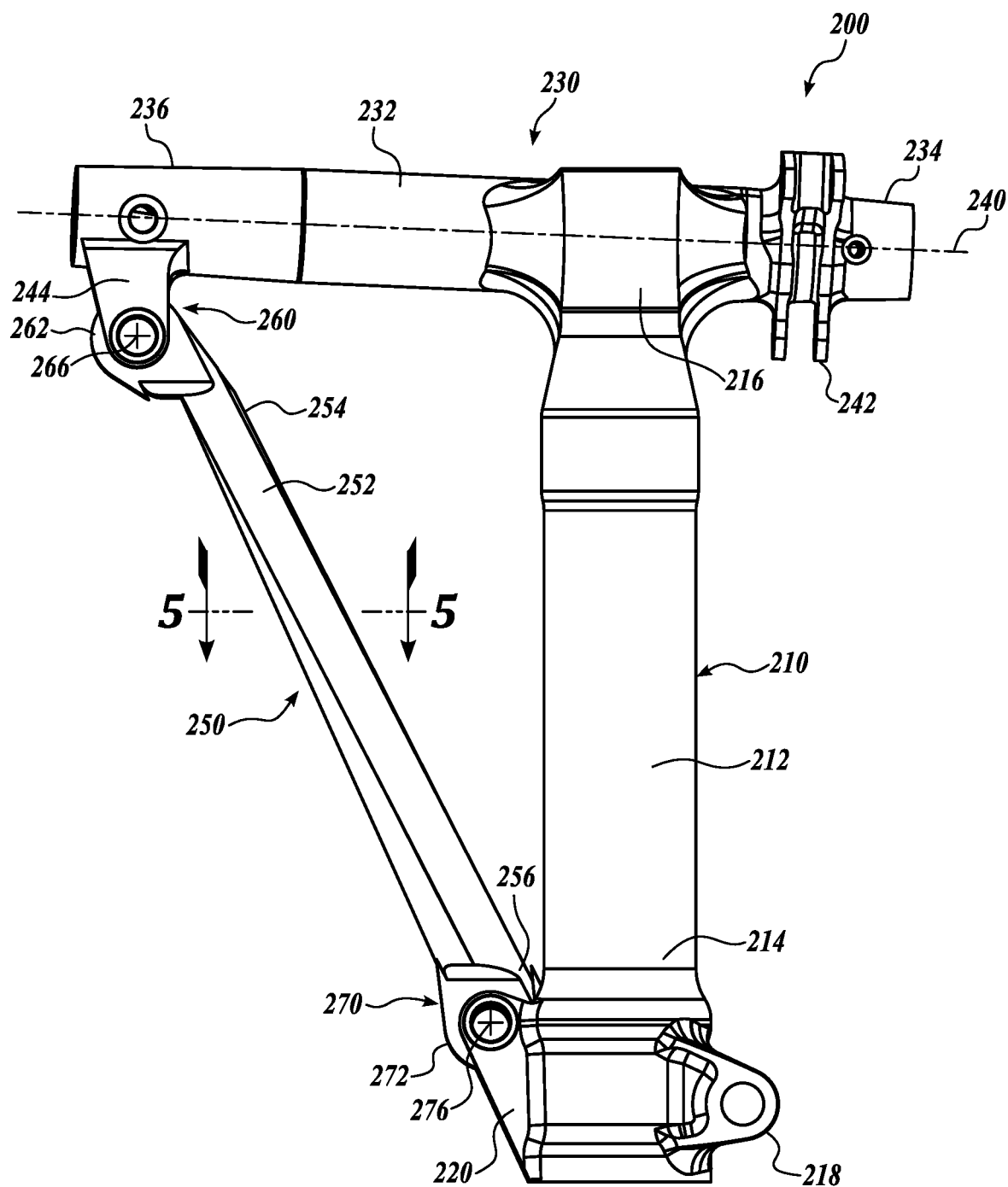
FIG. 4 shows a side view of FIG. 3.
Figure 5:
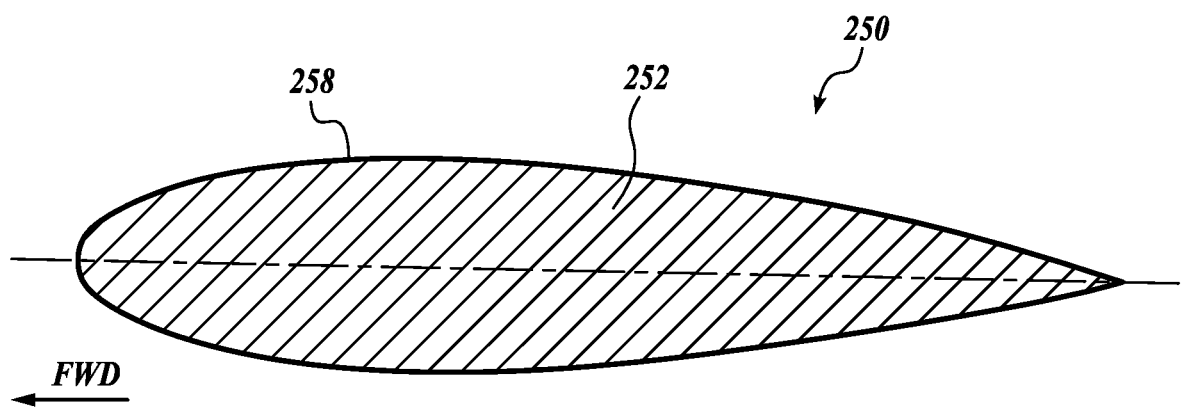
FIG. 5 shows a cross-sectional view of a drag arm of the main fitting as indicated in FIG. 4.

FIGS. 3-5 show a representative embodiment of a main fitting for a landing gear assembly according to various aspects of the present disclosure. The main fitting 200 is suitable for use as part of landing gear assemblies such as the landing gear assemblies 20 and 120 shown in FIGS. 1 and 2, respectively. In this regard, the main fitting 200 may be used in conjunction with one or more of a piston, a wheel assembly, a torque link, an actuator, and side brace in the manner of known landing gear assemblies. It will be appreciated that embodiments of the disclosed main fitting 200 may also be used with other landing gear assembly configurations, and such embodiments should be considered within the scope of the present disclosure.

Referring now to FIGS. 3 and 4, an embodiment of the main fitting 200 will be described. The main fitting 200 include main barrel 210 having an elongate body 212 with a first (lower) end 214 and a second (upper) end 216. The first end 214 of the elongate body 212 is configured to slidably receive a piston to which a wheel assembly is coupled. In this manner, the piston and the first end 214 of the elongate body cooperate to define a shock strut. A clevis 218 is positioned on the first end 214 of the elongate body 212 and is sized and configured to rotatably couple one end of a torque link (not shown) to the main fitting 200. In some embodiments, a second end of the torque link is rotatably coupled to the wheel assembly such that the torque link prevents rotation of the wheel assembly relative to the main fitting 200 about a central axis of the piston.

A trunnion 230 is disposed at the second end 216 of the elongate body 212. The trunnion 230 includes an elongate cross beam 232 extending laterally from the second end 216 of the main barrel 210. The cross beam 232 includes a first end 234 and a second end 236. A recess 238 is formed in each end of the cross beam 232, and each recess 238 is sized and configured to receive a pin to rotatably couple the trunnion 230 and, thus, the main fitting 200 to the aircraft about an axis 240.

In the illustrated embodiment, the main barrel 210 and the cross beam 232 are integrally formed, and the second end 216 of the main barrel is disposed between the first end 234 and the second end 236 of the cross beam 232. In some embodiments, the main barrel 210 and the cross beam 232 are discrete components that are coupled by mechanical fasteners, welding, or any other suitable connection or combination of connections. In some embodiments, the cross beam 232 is cylindrical and has a central axis coincident with the axis 240 of rotation of the trunnion 230. In some embodiments, the cross beam 232 is offset from the axis 240 of rotation of the trunnion 230, and the axis 240 is defined by devises, lugs, or both positioned at opposite ends of the trunnion. It will be appreciated that the main barrel 210 and the trunnion 230 of the illustrated embodiment are exemplary only, and various configurations are contemplated to accommodate different landing gear configurations. These and other suitable main barrel/trunnion configurations should be considered within the scope of the present disclosure.

A clevis 242 is formed on the first end 234 of the trunnion 230 to provide an interface to rotatably couple an actuator, a landing gear bay door panel, or any other suitable component to the main fitting 200. In some embodiments, the number and locations of the devises, as well as the components to be coupled to the devises varies to accommodate different landing gear assembly configurations. In some embodiments, one or more lugs is used in place of one or more of the devises.

Still referring to FIGS. 3 and 4, the main fitting 200 includes a drag arm 250 with an elongate body 252 that extends from a forward side of the main barrel 210 to the second (forward) end 236 of the cross beam 232. A first pivotal connection 260 pivotally couples a first end 254 of the elongate body 252 to the second end 236 of the cross beam 232 about a point 266. In the illustrated embodiment, a clevis 244 is formed on the cross beam 232, and a lug 262 is formed on the first end of the drag arm 250. A spherical bearing 264 is mounted in the lug 262, and a pin (not shown) extends through the spherical bearing to couple the lug 262 to the clevis 244 in a known pivotal configuration. In some embodiments, any suitable configuration is utilized to provide a pivotal connection between the drag arm 250 and the second end 236 of the cross beam 232.

A second pivotal connection 270 pivotally couples a second end 256 of the elongate body 252 to the first end 214 of the main barrel 210 about a point 276. In the illustrated embodiment, a clevis 220 is formed on the main barrel 210, and a lug 272 is formed on the second end of the drag arm 250. A spherical bearing 274 is mounted in the lug 272, and a pin (not shown) extends through the spherical bearing to couple the lug 272 to the clevis 224 in a known pivotal configuration. In some embodiments, any suitable configuration is utilized to provide a pivotal connection between the drag arm 250 and the first end 214 of the main barrel 210.

Figure 6:
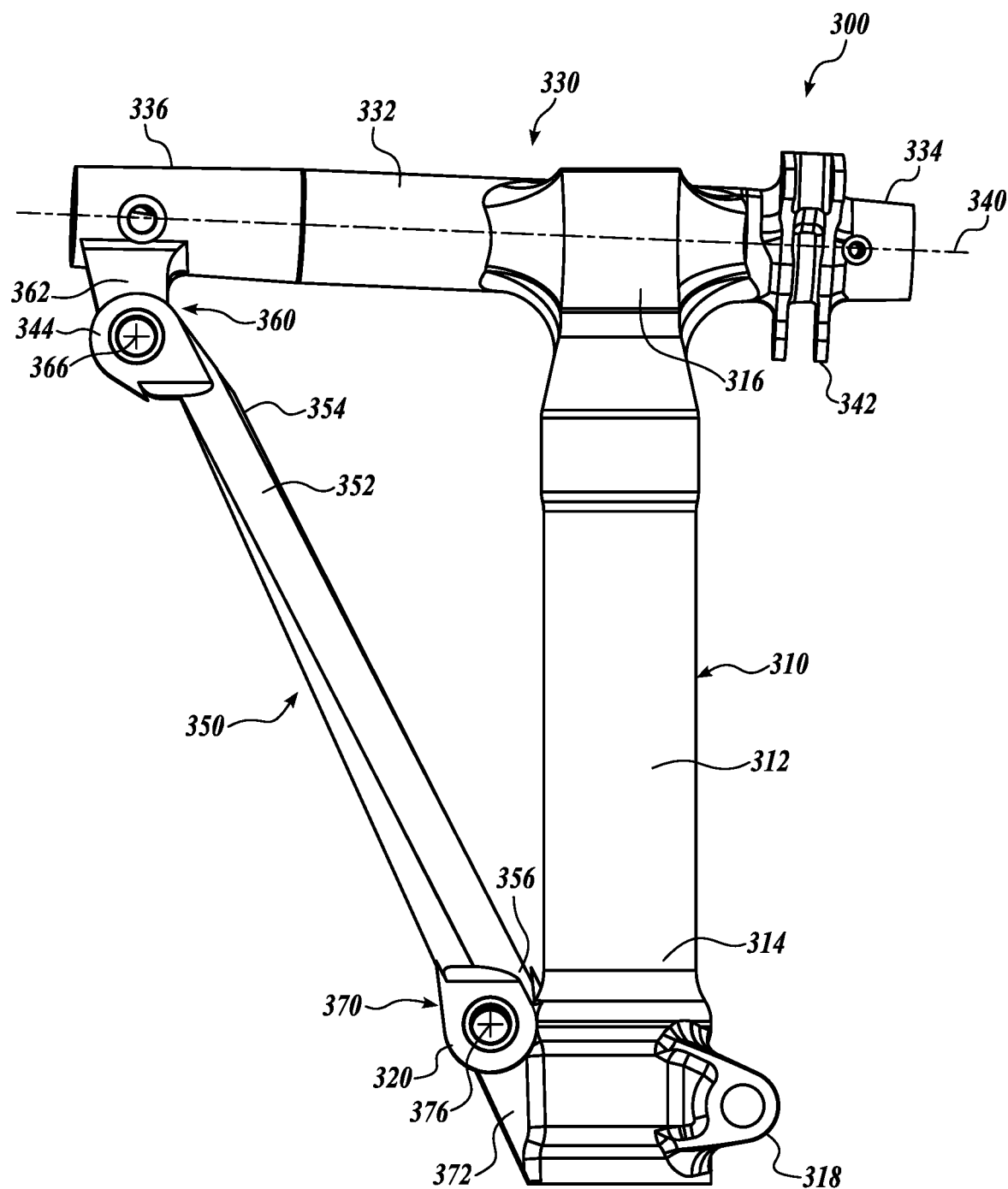
FIG. 6 shows another representative embodiment of the main fitting of a landing gear assembly shown in FIG. 4 according to aspects of the present disclosure.

FIG. 6 shows another embodiment of a main fitting 300 in accordance with aspects of the present disclosure. The main fitting is similar to the main fitting 200 shown in FIGS. 3 and 4, except as described below. For the sake of brevity, similar features and characteristics will not be described again with the understanding that features of the main fitting 300 identified by reference number 3XX correspond to similar features of main fitting 200 identified with reference number 2XX unless otherwise noted. For example, drag arm 350 and trunnion 330 shown in FIG. 6 correspond to drag arm 250 and trunnion 230, respectively, shown in FIGS. 3 and 4, unless otherwise noted.

The main fitting 300 is similar to previously described main fitting 200 except that devises 344 and 320 are integrally formed on opposite ends of the drag arm 350, and lugs 362 and 372 are integrally formed on the cross beam 332 and the main barrel 310, respectively. That is, the first pivotal connection 360 includes a lug 362 formed on the cross beam 332 and a clevis 344 formed on the drag arm 350. The second pivotal connection 370 includes a lug 372 formed on the main barrel 310 and a clevis 320 formed on the drag arm 350.

Referring back to FIG. 2, because the drag arm 250 is pivotally coupled at its ends to the main barrel 210 and the cross beam 232, the drag arm is only subject to tensile and compressive loads. That is, the pivotal connections at the ends of the drag arm 250 do not transfer bending moments, torsional loads, or loads not aligned with the line connecting the pivot points 266 and 276 of the pivotal connections. By limiting the loads reacted by the drag arm 250 to compressive and tensile loads, the design of the drag arm is simplified.

The disclosed drag arm 250 is removably mounted to the main barrel 210 and the cross beam 232 by virtue of the first and second pivotal connections 260 and 270. As such, unlike integrally formed drag arms, embodiments of the disclosed drag arm may be manufactured using materials and processes that are different than those used to manufacture the main barrel 210 and the cross beam 232. In some embodiments, the drag arm is formed from aluminum, composite materials, such as carbon fiber composites, or other suitable materials or combinations of materials. In some embodiments, the drag arm is formed by additive manufacturing, milling, or other suitable processes or combinations of processes. In addition, because the drag arm 250, main barrel 210 and cross beam 232 each has a lug or a clevis formed thereon as part of the pivotal joints, the need for complex transition surfaces between the drag arm 250 and the main barrel 210 and between the drag arm 250 and the cross beam 232 are avoided. Thus, the disclosed configuration provides a drag arm that is lighter, more easily manufactured, and less expensive. Further the disclosed drag arm allows for easy service and replacement as compared to known drag arm configurations.

FIG. 5 shows a cross-sectional view of the drag arm 250 as indicated in FIG. 4. As shown in FIG. 5, the body 252 of the drag arm 250 has an aerodynamic profile 258 that directs airflow impinging the landing gear to reduce drag and noise generated when the aircraft is moving at high speeds with the landing gear deployed, particularly during takeoff and landing. In the illustrated embodiment, the profile 258 is a symmetric airfoil. In some embodiments, the contour is adapted to a particular landing gear assembly on which the main fitting is used in order to further minimize noise and/or drag resulting from the deployed landing gear assembly.

Thus, the present disclosure provides a main fitting for an aircraft landing gear assembly, wherein the main fitting includes a detachable drag arm. The drag arm is pivotally coupled at each end to other main fitting components so that the drag arm is only subject to tension and compression loads along a line that connects the pivot points at the ends of the drag arm. Because the drag arm is detachable and subject to limited types of loads, the drag arm may be manufactured separately from other larger, heavier main fitting components. This in turn allows for a lighter drag arm that can be manufactured with alternate materials and by alternative manufacturing processes, such as additive manufacturing. Further, limiting the drag arm loading to axial loads allows for the drag arm to have an aerodynamic profile that reduces drag and noise.

As used herein, the term "upper" means "nearer to the aircraft body in the gear-down position," while the term "lower" means "further away from the aircraft body in the gear-down position." These terms are intended to facilitate understanding, not to limit the orientation or configuration of the inventive systems in practice. For example, unless expressly limited, a feature described as being located on or near an "upper" or "lower" end may, in other embodiments, be located on or near the "lower" or "upper" end, respectively. Further, it should be noted that for purposes of this disclosure, terminology such as "end," "inner," and "outer," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings.

The present application may reference quantities and numbers. Unless specifically stated, such quantities and numbers are not to be considered restrictive, but exemplary of the possible quantities or numbers associated with the present application. In this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A landing gear main fitting for an aircraft landing gear assembly, the main fitting comprising:
    a main barrel;
    a cross beam fixedly positioned relative to the main barrel and extending radially from the main barrel; and
    a drag arm comprising a first end pivotally coupled to the cross beam by a first pivotal connection and a second end pivotally coupled to the main barrel by a second pivotal connection, the second pivotal connection comprising a spherical bearing engaging the main barrel and the second end of the drag arm.

2. The landing gear main fitting of claim 1, wherein the cross beam and the main barrel are integrally formed.

3. The landing gear main fitting of claim 1, wherein the first pivotal connection comprises a clevis and a lug with a spherical bearing mounted thereto.

4. The landing gear main fitting of claim 3, wherein the lug is integrally formed with the drag arm, and the clevis is integrally formed with the cross beam.

5. The landing gear main fitting of claim 3, wherein the lug is integrally formed with the cross beam, and the clevis is integrally formed with the drag arm.

6. The landing gear main fitting of claim 1, wherein the second pivotal connection comprises a clevis and a lug with a spherical bearing mounted thereto, wherein one of the clevis and the lug is fixedly positioned relative to the main barrel, and the other of the clevis and the lug is fixedly positioned relative to the drag arm.

7. The landing gear main fitting of claim 6, wherein the lug is integrally formed with the drag arm, and the clevis is integrally formed with the main barrel.

8. The landing gear main fitting of claim 6, wherein the lug is integrally formed with the main barrel, and the clevis is integrally formed with the drag arm.

9. The landing gear main fitting of claim 1, wherein the first and second pivotal connections define first and second pivot points, respectively, wherein the drag arm is only subject to tensile and compressive loads along a line connecting the first and second pivot points.

10. The landing gear main fitting of claim 9, wherein the first and second pivotal connections do not impart bending loads or torsional loads to the drag arm.

11. The landing gear main fitting of claim 1, wherein at least a portion of the drag arm has an aerodynamic profile.

12. The landing gear main fitting of claim 11, wherein the aerodynamic profile defines an airfoil.

13. The landing gear main fitting of claim 1, wherein the drag arm comprises a different material than the main barrel.

14. The landing gear main fitting of claim 13, wherein the drag arm is manufactured by additive manufacturing.

15. The landing gear main fitting of claim 1, wherein the cross beam forms part of a trunnion configured to rotatably couple the landing gear assembly to the aircraft.

16. The landing gear main fitting of claim 15, wherein the trunnion further comprises first and second lugs defining an axis of rotation.

17. The landing gear main fitting of claim 15, wherein the cross beam comprises a cylindrical recess formed at each end to define an axis of rotation.

* * * * *